Figure 1:
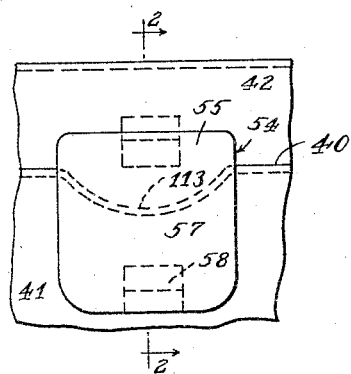

Oct. 25, 1932.  I. D. PERRY  1,884,839

DOOR BUMPER AND THE LIKE

Original Filed July 27, 1931

Inventor:
Ira D. Perry
By Wilson, Dowell, McCanna & Rehm
Attys.

Patented Oct. 25, 1932

1,884,839

UNITED STATES PATENT OFFICE

IRA D. PERRY, OF CHICAGO, ILLINOIS, ASSIGNOR TO EDNA L. MEYER, OF ROCKFORD, ILLINOIS

DOOR BUMPER AND THE LIKE

Original application filed July 27, 1931, Serial No. 553,288. Divided and this application filed June 6, 1932. Serial No. 615,582.

This invention has to do with improvements in door bumpers for automobile bodies and the like. The invention herein disclosed has reference particularly to improvements in door bumpers for vehicles such as automobiles, etc., but the features of invention are not limited to this or any other particular class of service. However, in view of the fact that these door bumpers are generally used in connection with the doors of such vehicles, I have illustrated and will describe this particular application of the invention, but in so doing, I wish it clearly understood that I do not intend thereby to limit myself except as I may do so in the claims.

The doors of vehicles such as automobiles, etc., are usually provided with a contacting edge portion which moves into or towards a shoulder or ledge formed along a permanent portion of the structure of the vehicle, such as the door pillar thereof. This door pillar is usually provided with a companion ledge, the pillar having a ledge surface against or towards which the companion edge surface portion of the door approaches when the door is shut. This surface of the pillar faces in the direction of door closing movement. The pillar is also provided with another surface approximately at right angles to the surface just referred to, and lying substantially parallel to the direction of door closing movement.

One feature of the present invention relates to the provision of a door bumper for use in connection with the pillar above referred to, which door bumper is so arranged and supported in or on the pillar that there is provided a relatively large and rigid surface at the back side of the door stop so as to enable the same to very effectively resist the pressure and shock incident to the door closing operation.

In connection with the foregoing, it is a further feature of the invention to provide arrangements whereby the resilient block will be very effectively attached and connected to the pillar at or adjacent to the position of face contact support aforesaid, so that not only will the resilient block be able to properly and effectively receive and resist the severe forces incident to the shock of closing the door, but also the resilient block will be properly held in place against rebounds or sudden deflections created either at the instant of opening or the instant of closing the door.

In connection with the foregoing, it is a further object of the invention to provide means whereby the resilient block may be readily attached and permanently connected to the pillar and effectively held in place thereon without the need of any additional or supplemental attaching devices other than the resilient block and the form of the door pillar itself. In this connection it is an object of the invention to provide arrangements whereby the resilient block may be "snapped" or "buttoned" into place on the door pillar, and the parts being relatively so formed that the resilient block may be forced home with respect to suitable receiving openings of the pillar and will thereupon lock itself to the pillar.

In connection with the foregoing it may also be considered to be an object of the invention to provide an angle or L-shaped door bumper, one arm or branch of which overlies the ledge of the door pillar, and the other arm or branch of which overlies the flange of the door pillar, both of said arms or branches of the door bumper being individually connected to the adjacent portions of the door pillar, the metal of the door pillar being substantially uncut or severed at any point between these points of attachment. The result is that the door bumper is connected to the pillar at two points remote from each other measured in a plane lying at right angles to the direction of door closing movement as distinguished from an arrangement in which the bumper is connected to the pillar at points separated from each other but lying in a plane parallel to the direction of door closing movement.

Other objects of the invention will appear in the course of the following detailed description in which reference is made to the accompanying drawing, wherein—

Figure 2:
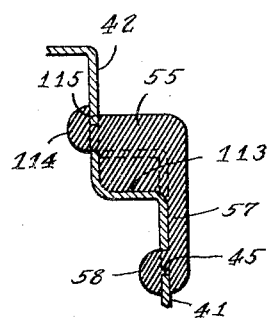

Figure 1 is a fragmentary face view of a section of sheet metal door pillar of improved construction having applied thereto a novel form of bumper block made in accordance with this invention, and Fig. 2 is a cross-section on the line 2—2 of Figure 1 looking in the direction of the arrows.

This application is a division of my co-pending application Serial No. 553,288, filed July 27, 1931.

Referring to the drawing, a sheet metal door pillar is illustrated having a ledge 40 which faces in the direction of door closing movement. The pillar is also provided with an inwardly projecting flange 41 and an outwardly projecting flange 42 lying parallel with the direction of door closing movement. The edge of the door which is to have contact with the pillar in closing is provided with a projecting ledge to overlie the ledge 40 of the pillar, the edge of the door having the desired operating clearance with respect to the flanges 41 and 42.

It is an important feature of the present invention that the ledge 40 of the pillar is imperforate so that strength and stiffness are not sacrificed, and so that the body portion of the bumper block finds direct support on a flat surface on the door pillar ledge to best withstand pressures and shocks incident to the closing of the door.

As clearly appears in the drawing, the ledge 40 of the pillar is depressed at the position of the bumper block to provide a curved or rounded depression 113. This depression is formed by transferring a portion of metal from the inner flange 41 to the depression 113 and a corresponding portion of metal from the depression 113 to the outer flange 42, thus avoiding stretching and gathering of metal, it being obvious that stretching would mean likelihood of weakening or tearing the metal, whereas gathering would mean a tendency for the metal to bulge and wrinkle.

The bumper block 54 of resilient material is so formed that its head portion 55 conforms to the depression 113, thus providing an increased thickness of resilient material for good cushioning effect. Obviously, the fit of the block in the depression reduces the tendency for the block to move lengthwise of the pillar in either direction under the pressure and shock incident to the door closing thereon, the block having a natural tendency to center itself in the depression at all times.

The bumper block is substantially L-shaped in cross-section so as to provide a flange 57 to overlie the inner flange 41 of the pillar. An inwardly and downwardly extending hooked portion 58 is formed on the end of the flange 57 for engagement in an opening 45 in the flange 41. The head portion 55 is also provided with a hooked portion 114 projecting in the opposite direction from the hooked portion 58 and arranged to engage in a hole 115 provided in the outer flange 42 of the door pillar. The hooked portions 58 and 114 simply hold the bumper block 54 in place on the pillar, fitting in the depression 113. Due to the form of the depression, as indicated before, the lugs are relieved of strain in a plane parallel with the ledge 40, and there is very little strain otherwise imposed on these lugs in operation so that they will easily last the life of the block.

The bumper block is set and secured in place by distortion of the material thereof sufficient to enter the hooked portions 58 and 114 in the holes 45 and 115, respectively. The block is held in place without the necessity for any extraneous attachment means such as screws or bolts or clamping devices.

It is believed the foregoing description conveys a good understanding of this invention. The appended claims have been drawn so as to cover all legitimate modifications and adaptations.

I claim:

1. A door buffer device comprising a pillar member having a ledge portion facing in the direction of door closing movement and formed to provide a transverse depression at the position of the bumper block, a bumper block extending across said ledge portion, the said depression having sloping sides whereby the same is deepest at the middle, said block being enlarged in the direction of door closing movement, the enlarged portion being received in the aforesaid depression and formed with sloping surfaces to fit the sides of the depression, and means for securing the bumper block to the pillar member, said last mentioned means comprising lugs provided on the bumper block in a transverse plane coincident with the middle of the depression, said pillar member being provided with openings at opposite sides of said depression arranged to receive said lugs.

2. A door buffer device comprising a pillar member having an impact ledge and oppositely extending side flanges, each of said flanges having an opening, the impact ledge being formed so as to provide a transverse depression at the position of the bumper block, the opposite sides of said depression being sloped so that the depression is deepest at the middle, a substantially L-shaped bumper block having one portion extending across said ledge toward the adjacent side flange and another portion overlying the outside of the other side flange, said block having the first portion thereof enlarged in the direction of door closing movement and entered in said depression, the enlarged portion being formed with sloping surfaces to fit the sloping sides of said depression, said block having portions overlying said openings, and means passing through said openings and anchoring said block to the pillar member on opposite sides of said ledge.

3. A door buffer device comprising a pillar member having a ledge portion facing in the direction of door closing movement and formed to provide a transverse depression at the position of the bumper block, a bumper block extending across said ledge portion, the said depression having sloping sides whereby the same is deepest at the middle, said block being enlarged in the direction of door closing movement, the enlarged portion being received in the aforesaid depression and formed with sloping surfaces to fit the sides of the depression, and means adjacent opposite ends of said depression for securing the bumper block to the pillar member in the position stated.

4. A door buffer device comprising a sheet metal pillar member formed to provide an impact ledge and a side flange, the flange having an opening provided therein at the position of the bumper block, the impact ledge being formed so as to provide a transverse depression as an integral part of the pillar member at the position of the bumper block, the opposite sides of said depression being sloped toward each other, a substantially L-shaped bumper block of resilient material having one portion extending across said ledge and another portion overlying the outside of the side flange, said block having the first portion thereof enlarged in the direction of door closing movement and entered in said depression, the enlarged portion being formed with sloping surfaces to fit the sloping sides of said depression, the other portion of the block overlying the opening in the side flange, and means passing through said opening and anchoring the block to the pillar member.

In witness of the foregoing I affix my signature.

IRA D. PERRY.